United States Patent [19]

Date et al.

[11] Patent Number: 5,420,848
[45] Date of Patent: May 30, 1995

[54] OPTICAL SYSTEM FOR OPTICAL INFORMATION RECORDING/REPRODUCING APPARATUS HAVING A GALVANO MIRROR

[75] Inventors: Nobuaki Date, Kawasaki; Kazuhiko Matsuoka, Yokohama; Kenichi Sasaki, Tokyo, all of Japan

[73] Assignee: Canon Kabushiki Kaisha, Tokyo, Japan

[21] Appl. No.: 242,048

[22] Filed: May 13, 1994

Related U.S. Application Data

[63] Continuation of Ser. No. 738,536, Jul. 31, 1991, abandoned.

[30] Foreign Application Priority Data

| Aug. 2, 1990 | [JP] | Japan | 2-203963 |
| Aug. 2, 1990 | [JP] | Japan | 2-203964 |
| Jan. 28, 1991 | [JP] | Japan | 3-025090 |
| Jul. 9, 1991 | [JP] | Japan | 3-194932 |
| Jul. 15, 1991 | [JP] | Japan | 3-173949 |

[51] Int. Cl.⁶ ............................................. G11B 7/00
[52] U.S. Cl. .............................. 369/112; 369/119; 369/44.14; 369/54
[58] Field of Search ............ 369/44.14, 44.11, 44.17, 369/44.24, 112, 118, 119, 120, 44.23, 110, 111, 44.26, 44.21, 44.22, 117, 53, 54; 250/201.5; 359/873, 874, 876, 877, 881

[56] References Cited

U.S. PATENT DOCUMENTS

| 4,139,263 | 2/1979 | Lehureau et al. | 369/110 |
| 4,466,088 | 8/1984 | Trethewey | 369/44.14 |
| 4,571,714 | 2/1986 | Mathews et al. | 369/44.26 |
| 4,589,102 | 5/1986 | Volleau et al. | 369/119 |
| 4,742,219 | 5/1988 | Ando | 369/44.23 |
| 4,750,162 | 6/1988 | Tajima | 369/46 |
| 4,853,917 | 8/1989 | Koyama et al. | 369/44.23 |
| 4,868,804 | 9/1989 | Le Carvennec et al. | 369/110 |
| 4,879,706 | 11/1989 | Lee | 369/44.23 |
| 4,907,858 | 3/1990 | Hara et al. | 359/629 |
| 4,953,124 | 8/1990 | Koyama | 365/122 |
| 4,973,836 | 11/1990 | Matsuoka | 250/201.5 |
| 5,004,326 | 4/1991 | Sasaki | 359/281 |
| 5,070,493 | 12/1991 | Marshall et al. | 369/112 |
| 5,161,243 | 11/1992 | Ishida et al. | 369/44.37 X |

FOREIGN PATENT DOCUMENTS

| 57-200958 | 12/1982 | Japan. | |
| 0111139 | 7/1983 | Japan | 369/44.23 |
| 0016149 | 1/1984 | Japan | 369/110 |
| 0182640 | 8/1986 | Japan | 369/44.14 |
| 0194647 | 8/1986 | Japan | 369/44.23 |
| 0287437 | 12/1987 | Japan | 369/44.14 |

*Primary Examiner*—W. R. Young
*Assistant Examiner*—Thang V. Tran
*Attorney, Agent, or Firm*—Fitzpatrick, Cella, Harper & Scinto

[57] ABSTRACT

An optical system for an optical information recording/reproduction apparatus, includes a light source, an objective lens for focusing a light beam from the light source on a recording medium, a beam splitter arranged between the light source and the objective lens, a detector for detecting a light beam split by the beam splitter, a galvano mirror arranged between the objective lens and the beam splitter, the galvano mirror having an opening, and a sensor for receiving the light beam from the light source via the opening.

12 Claims, 14 Drawing Sheets

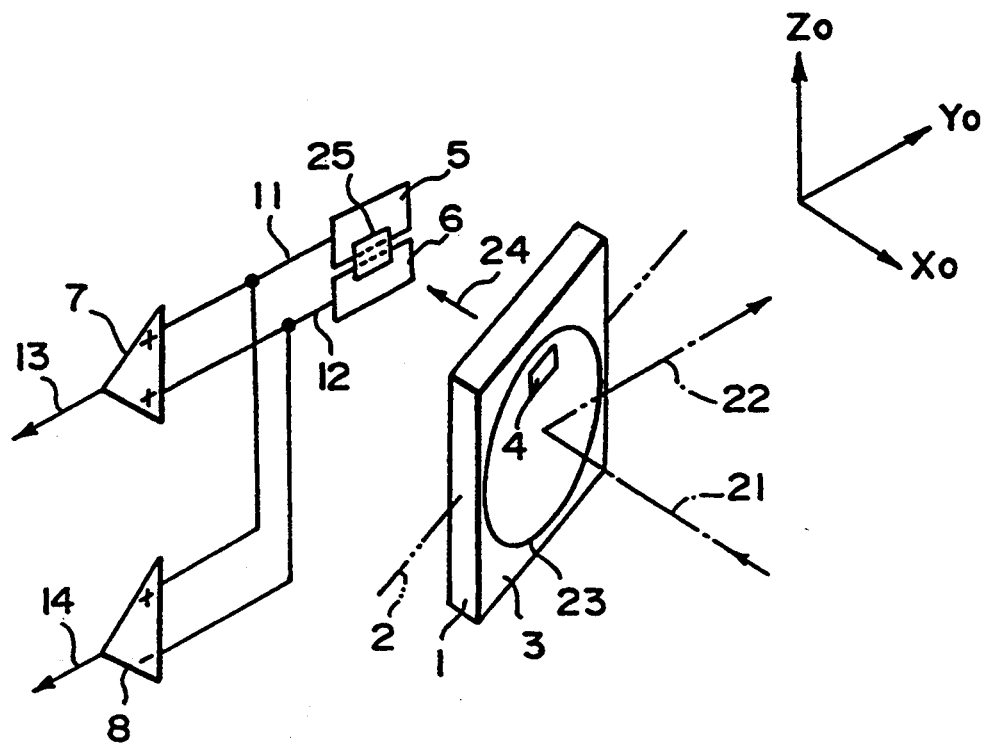
F I G. 3

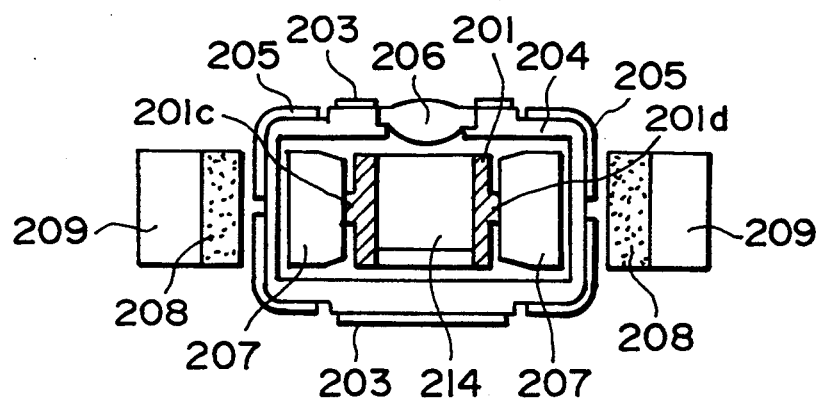
F I G. 10
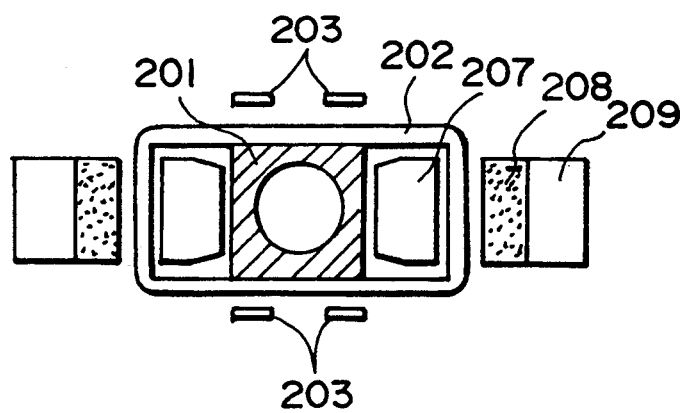
F I G. 11
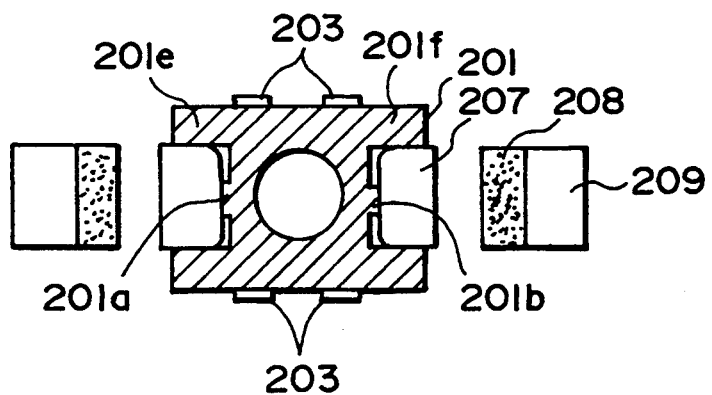
F I G. 12

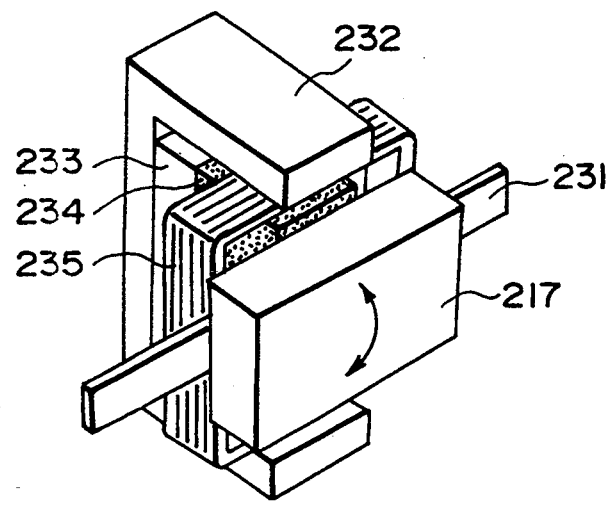
F I G. 13
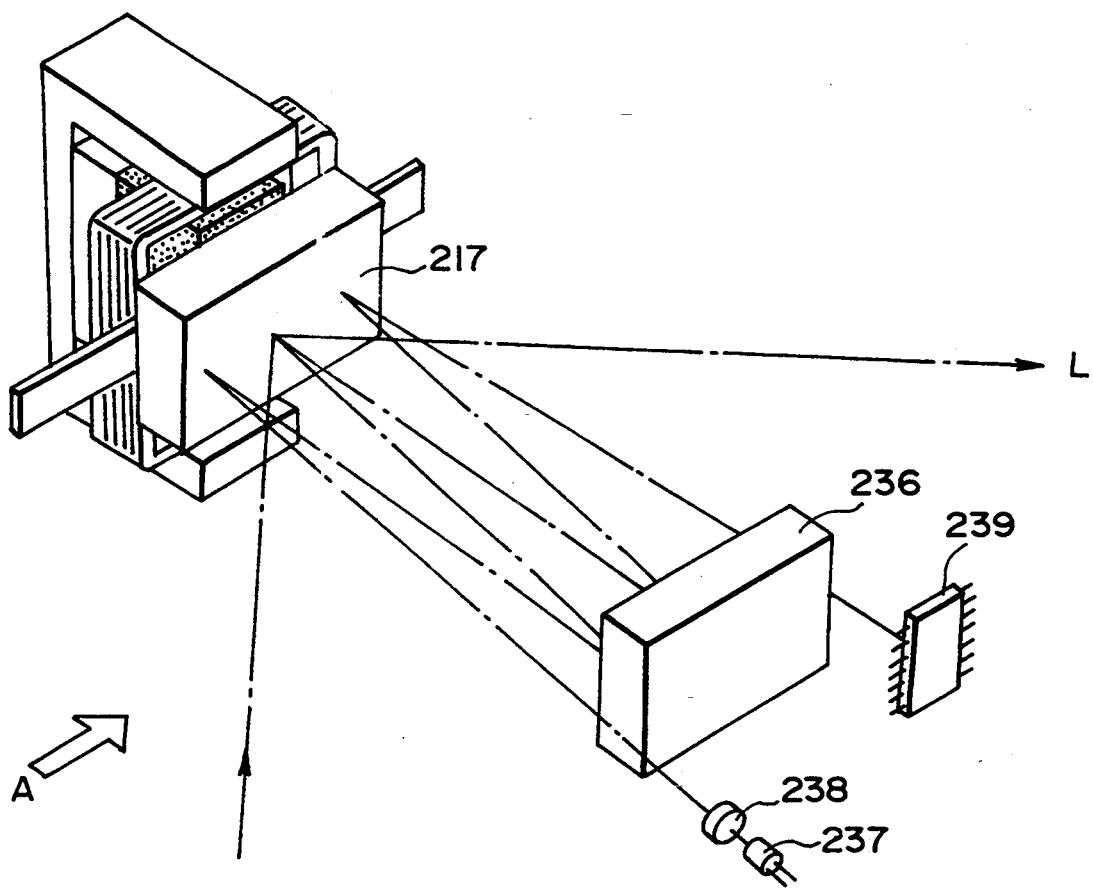
F I G. 14

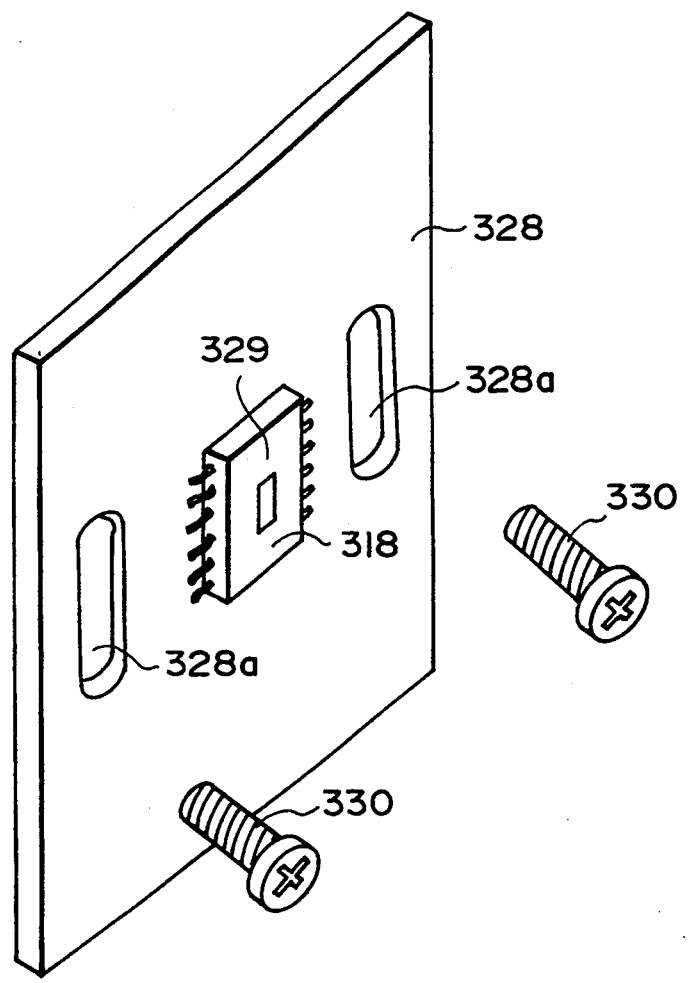
F I G. 17
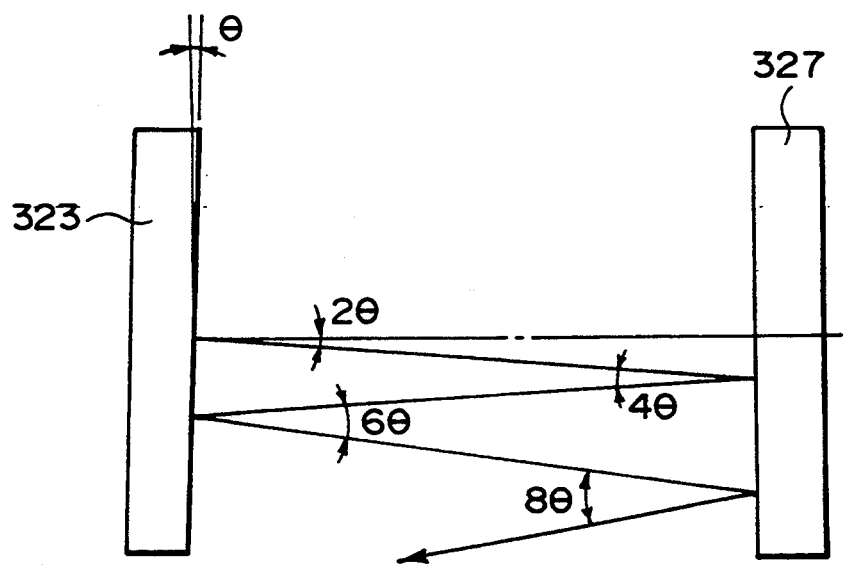
F I G. 18

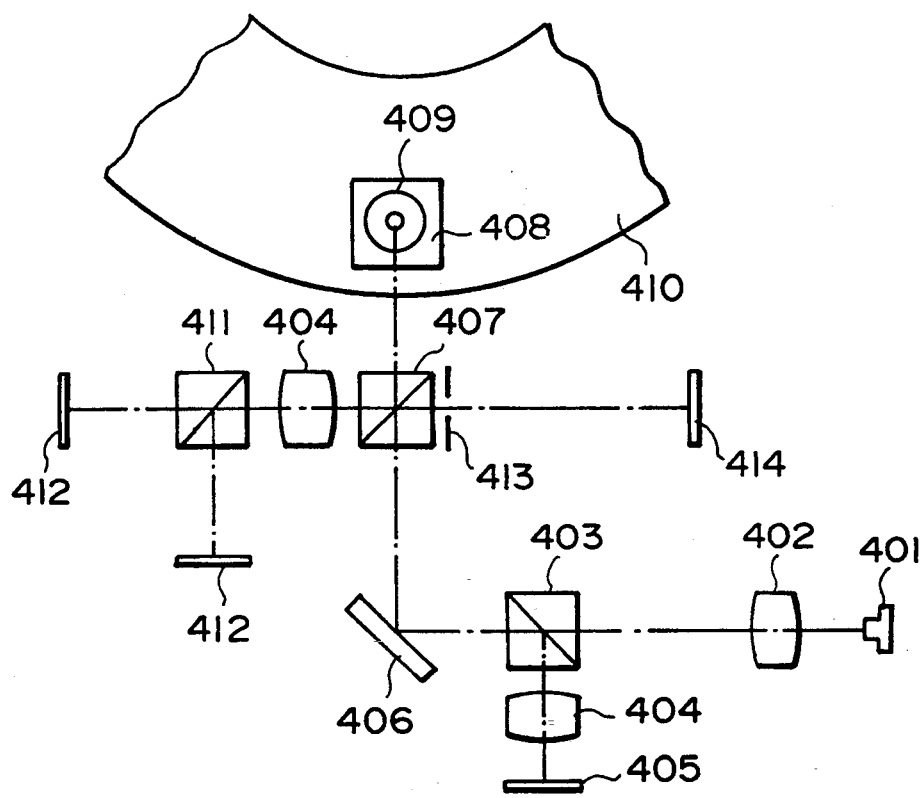
F I G. 19
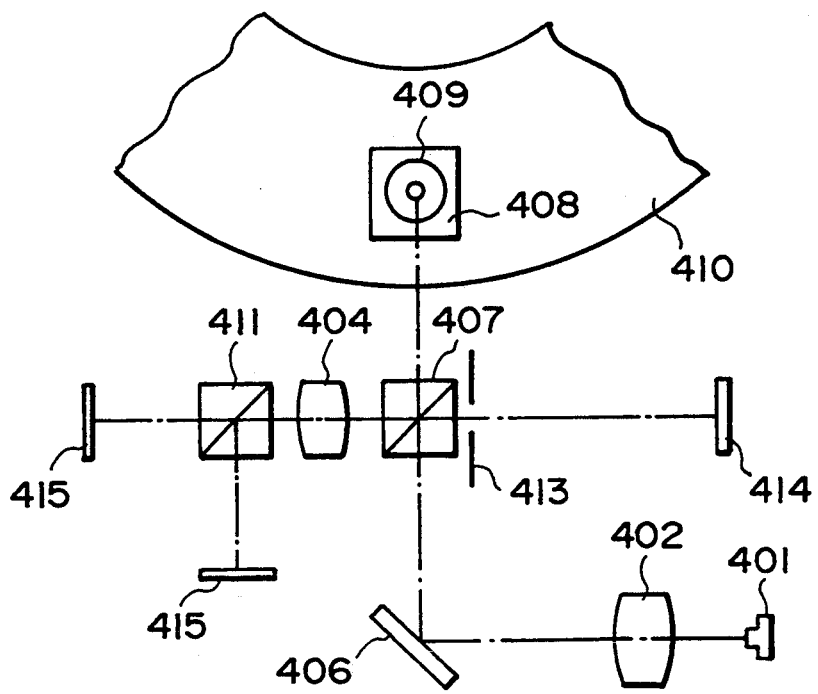
F I G. 21

OPTICAL SYSTEM FOR OPTICAL INFORMATION RECORDING/REPRODUCING APPARATUS HAVING A GALVANO MIRROR

This application is a continuation of prior application, Ser. No. 07/738,536, filed Jul. 31, 1991, now abandoned.

BACKGROUND OF THE INVENTION

1. Field of the Invention

The present invention relates to an optical system for an optical information recording/reproduction apparatus for recording information on an optical disk as an optical information recording medium, or an optomagnetic recording medium by focusing light via an objective lens, and/or reproducing information on the basis of light reflected by the recording medium.

2. Related Background Art

In order to optically or optomagnetically record and/or reproduce information, a conventional optical information recording/reproduction apparatus employs the following optical system. More specifically, this optical system will be described using an X-Y-Z three-dimensional coordinate system, as shown in FIG. 1. Divergent light components (beam) 171 from a semiconductor laser 101 are collimated into parallel light components 172 by a collimator lens 102, and the parallel light components (beam) 172 propagate in the positive direction of the X axis. Some of the light components 172 are reflected by a polarization beam splitter 103, become light components (beam) 173 propagating in the negative direction of the Z axis, and reach an APC sensor 104. The sensor 104 detects the amount of the light components 173, thereby detecting the emission amount of the semiconductor laser 101. For example, when the emission amount of the laser 101 is drifted from a desired emission amount under the influence of a change in environmental temperature, the emission amount of the semiconductor laser 101 is controlled to have a desired value using an APC control circuit (not shown).

On the other hand, light components (beam) 174 transmitted through the beam splitter 103 sequentially change their propagation directions via a galvano mirror 105 and a mirror 106, and are then focused as a light spot on a recording surface of a recording medium 109 such as an optomagnetic disk by an objective lens 107. The mirror 106 and the objective lens 107 constitute a movable optical system 108 as a unit (portion surrounded by a broken line), and can be moved in the radial direction (indicated by an arrow 151) of the recording medium 109. That is, the mirror 106 and the lens 107 constitute a so-called separated optical system, and allow a high-speed access operation.

Light components (beam) 175 reflected by the recording medium 109 propagate along the above-mentioned optical path in the reverse direction. Some of the light components 175 are reflected by the beam splitter 103 as light components (beam) 176 propagating toward the positive direction of the Z axis, i.e., toward a ½ wavelength plate 110. In this case, the divergent light components 171 from the semiconductor laser 101 are linearly polarized light oscillating within the X-Z plane. However, the ½ wavelength plate 110 is set so that the direction of polarization of transmitted light components 177 (beam) forms an angle of 45° with respect to the X-Y plane. Therefore, the transmitted light components 177 are polarized and split by a polarization beam splitter 112 into light components (beam) 178 propagating toward a sensor 113 consisting of light-receiving units $113_1$, $113_2$, $113_3$, and $113_4$, and light components (beam) 179 propagating toward a sensor 114 after they are transmitted through a sensor lens system 111 including a spherical lens and a cylindrical lens.

In this prior art described above, auto-focus control (to be referred to as AF control hereinafter) is performed by an astigmatism method. More specifically, an AF control circuit (not shown) drives the objective lens 107 in the Y-axis direction on the basis of a differential signal between the sum of outputs from the light-receiving units $113_1$ and $113_3$, and the sum of outputs from the light-receiving units $113_2$ and $113_4$.

On the other hand, auto-tracking control (to be referred to as AT control hereinafter) is performed by a push-pull method. More specifically, an AT control circuit (not shown) rotates the galvano mirror 105 about a rotational axis 115 which is present in the X-Z plane, and forms an angle of 45° with the X-axis (arrow 152) on the basis of a differential signal between the sum of outputs from the light-receiving units 113 and $113_2$, and the sum of outputs from the light-receiving units $113_3$ and $113_4$. Thus, the light spot is moved in the radial direction (arrow 153) on the recording medium 109.

In this manner, in the separated optical system, since the galvano mirror 105 is arranged on the stationary optical system side, the weight of the movable optical system can be reduced, and this is advantageous in terms of high-speed access.

Note that an optomagnetic signal is reproduced using a differential signal between the sum of outputs from the light-receiving units $113_1$ to $113_4$, and the output from the sensor 114.

However, when APC control is made using the output from the sensor 104 such as in the prior art, an unstable factor may be added to the control. More specifically, in order to perform precise APC control, the ratio of the light amount of light components 174 transmitted through the beam splitter 103 and propagating toward the objective lens 107 to the light amount of light components 174 propagating toward the sensor 104 must be constant. The transmittance, reflectance, and absorption coefficient of a film of the beam splitter 103 may slightly drift over time or under the influence of the environmental temperature or humidity. As a result, the above-mentioned light amount ratio drifts.

When the APC control is performed in such an undesirable state, since the semiconductor laser 101 emits light of an amount beyond a predetermined value, its service life may be undesirably shortened, and information recorded on the recording medium 109 may be destroyed in an information reproduction mode. When the semiconductor laser 101 emits light of an amount below the predetermined value in an information recording mode, an energy level necessary for recording cannot be assured on the recording medium 109, and a sufficient C/N ratio may not often be obtained in the reproduction mode. In addition, since the amount of light reaching the sensors 113 and 114 is small in the information reproduction mode, a sufficient C/N ratio may not often be obtained.

When the galvano mirror 105 is pivoted, the following problem is posed. More specifically, when the galvano mirror 105 is pivoted in a direction of the arrow 152 to perform AT control, light components are displaced in the X direction on the sensor 113, and the AT control signal is undesirably offset.

Thus, the pivotal angle of the galvano mirror 105 must be limited to a small angle, thereby substantially preventing a reproduction signal from being degraded. Instead, the movable optical system 108 must be precisely moved at high speed in a direction of the arrow 151. Alternatively, the pivotal angle of the galvano mirror 105 may be detected to obtain an offset amount based on the detection amount, and an AT control signal obtained from the sensor 113 may be corrected using the offset amount. FIG. 2 exemplifies a means for detecting the pivotal angle of the galvano mirror 105. In this means, the galvano mirror 105 is rotated about the rotational axis 152. For this reason, incident light components 174 are deflected from one state 181 to another state 182. The pivotal angle detection means is arranged on the rear surface side of the galvano mirror 105. Light components from an LED 121 are reflected by the rear surface of the galvano mirror 105, and the propagation direction of reflected light components is changed upon pivotal movement of the galvano mirror 105. Therefore, a sensor 122 having two light-receiving units $122_1$ and $122_2$ is placed in the optical path of the reflected light components, and paying attention to a difference 123 between outputs from the two light-receiving units, the difference 123 is almost linearly changed upon rotation of the galvano mirror 105. When the pivotal angle detection means is arranged in this manner, the offset amount of an AT control output can be corrected. However, a special means for detecting the pivotal angle must be prepared. As a result, the overall apparatus becomes complicated and bulky, and its cost is inevitably increased.

SUMMARY OF THE INVENTION

The present invention has been made in consideration of the above situation, and has as its object to provide an optical system for an optical information recording/reproduction apparatus, which can realize stable APC control and AT control with a relatively simple structure.

It is another object of the present invention to provide an optical system for an optical information recording/reproduction apparatus, which can realize stable AT control and stable APC control.

In order to achieve the above objects, according to the present invention, in an optical system for an optical information recording/reproduction apparatus, which system is arranged, so that when light is converged on an optical recording medium for optically or optomagnetically recording and/or reproducing information through an objective lens, light emitted from a light source is focused on a recording surface of the recording medium via a polarization beam splitter and the objective lens, and light reflected by the recording surface is projected onto a photodetector via the objective lens and the polarization beam splitter, and which system pivot-controls a galvano mirror arranged between the polarization beam splitter and the objective lens so as to perform AT control, a transmission opening is formed in the galvano mirror, and light components transmitted from the light source side via the opening are received by a sensor, the rotational angle of the galvano mirror is detected based on an output signal from the sensor, and the light amount of the light source is detected based on the output signal.

The light transmitted through the transmission opening corresponds to some components of light propagating from the polarization beam splitter toward the recording medium. Therefore, when the light amount is measured based on this light, a stable, correct value can be obtained without being influenced by changes in transmittance, reflectance, and absorption coefficient over time of a film of the polarization beam splitter, or environmental temperature or humidity.

BRIEF DESCRIPTION OF THE DRAWINGS

FIGS. 3, 4, and 6 are views showing embodiments of a means for detecting a rotational angle of a galvano mirror according to the present invention;

FIG. 10 is a sectional view taken along a line A—A in FIG. 9;

FIG. 11 is a sectional view taken along a line B—B in FIG. 9;

FIG. 12 is a sectional view taken along a line C—C in FIG. 9;

FIG. 13 is a perspective view showing a structure of a galvano mirror drive means;

FIG. 14 is a perspective view showing an arrangement for detecting a rotational angle of a galvano mirror;

FIG. 17 is an explanatory view of a mounting method of a rotational angle detection light-receiving element;

FIG. 18 is an explanatory view of a rotational angle enhance process of the galvano mirror;

FIG. 19 is a plan view for explaining an embodiment of an optical head used in an optical information recording/reproduction apparatus of the present invention;

FIG. 21 is a plan view for explaining another embodiment of an optical head used in an optical information recording/reproduction apparatus of the present invention.

DESCRIPTION OF THE PREFERRED EMBODIMENTS

Figure 1:
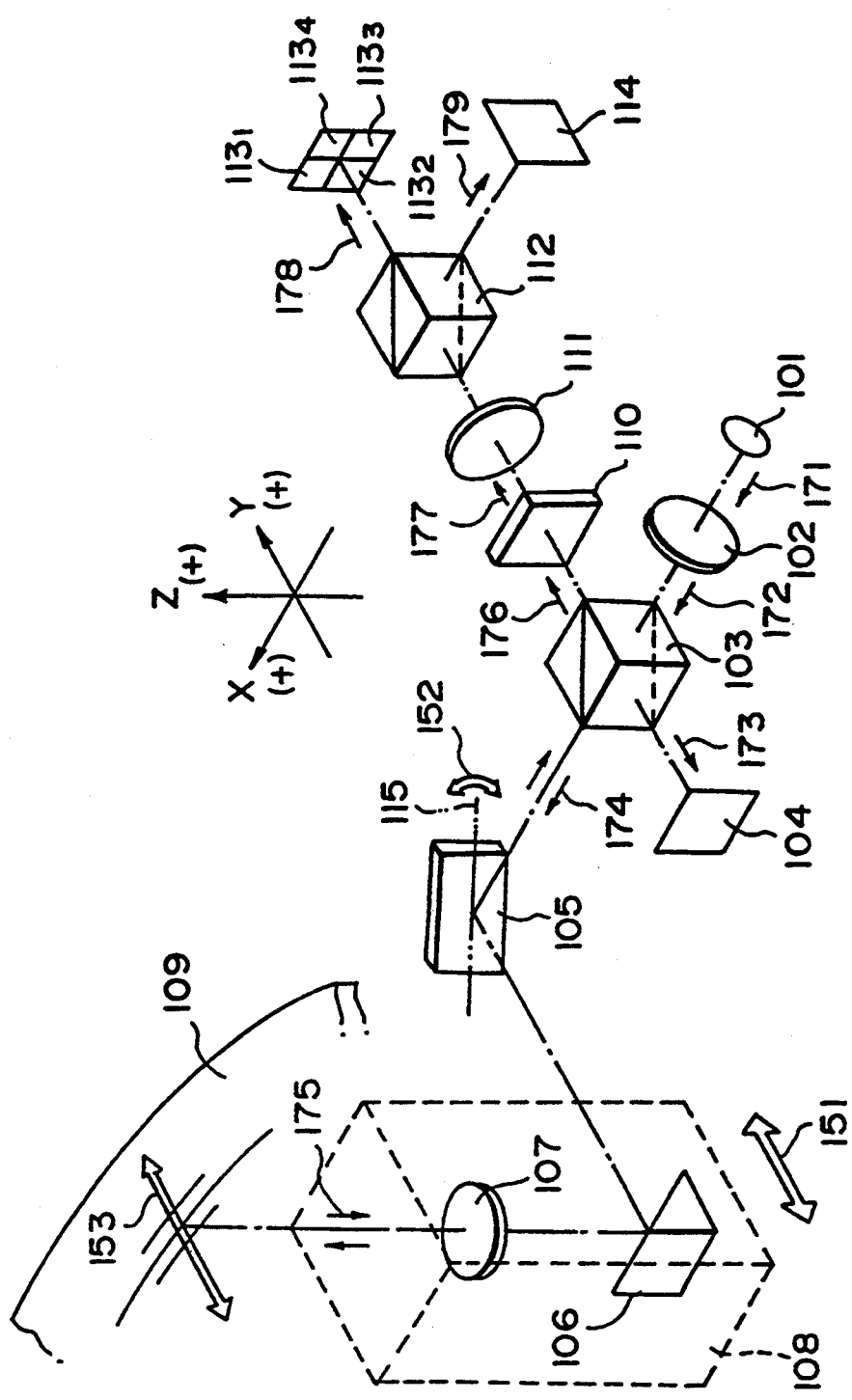
FIG. 1 is a view for explaining an optical system for a conventional optical information recording/reproduction apparatus.

An embodiment of a galvano mirror used in an optical information recording/reproduction apparatus of the present invention will be described in detail below with reference to FIG. 3. The following description will be made on the basis of an $X_0$-$Y_0$-$Z_0$ three-dimensional coordinate system. A galvano mirror 1 is subjected to rotation control about a rotational axis 2 (means for rotation is not shown). Light components (beam) 21 from a semiconductor laser propagate in the negative direction of the $X_0$ axis, and are reflected by a mirror surface 3 of the galvano mirror 1 to be converted into reflected light components (beam) 22 propagating toward an objective lens arranged in the positive direction of the $Y_0$ axis. A rectangular transmission opening 4 is formed in a region 23 of the galvano mirror 1 used for reflection so as to have a predetermined distance in a direction perpendicular to the rotational axis of the mirror 1. Some of the incident light components 21 are transmitted through the transmission opening 4, and are converted into light components (beam) 24 for defining a spatial pattern 25. The transmitted light components project the spatial pattern 25 across two sensors 5 and 6 arranged to be separated from each other by a predetermined distance in the $Z_0$-axis direction (in a direction perpendicular to the rotational axis of the galvano mirror). Outputs 11 and 12 obtained by photoelectric conversion in the two sensors are supplied to a sum signal calculation unit 7 and a difference signal calculation unit 8, thus generating a sum signal 13 and a difference signal 14.

In this arrangement, when the galvano mirror 1 is rotated about the rotational axis 2 (by about 30 minutes) for AT control, the reflected light components 22 have a given angle with respect to the $Y_0$ axis in a plane almost parallel to the $Y_0$-$Z_0$ plane. Since the galvano mirror 1 is formed of a flat glass plate having a finite thickness, the refraction effect of the galvano mirror 1 functions, and the transmitted light components 24 have components shifted in the $Z_0$-axis direction. In other words, the spatial pattern 25 has components moved in the $Z_0$-axis direction on the two sensors 5 and 6 upon rotation of the galvano mirror 1. Therefore, if the total area of the sensors 5 and 6 is sufficiently larger than the area of the spatial pattern 25, and the interval between the two sensors is sufficiently smaller than the width of the spatial pattern 25 in the $Z_0$-axis direction, the sum signal 13 is almost not changed. More specifically, the sum signal 13 is changed when the light amount of the incident light components 21 is changed, and can be used as a stable APC signal for the semiconductor laser. On the other hand, since the difference signal 14 is sensitively changed upon rotation of the galvano mirror 1, it can be used as a rotational angle detection signal of the galvano mirror 1.

Figure 4:
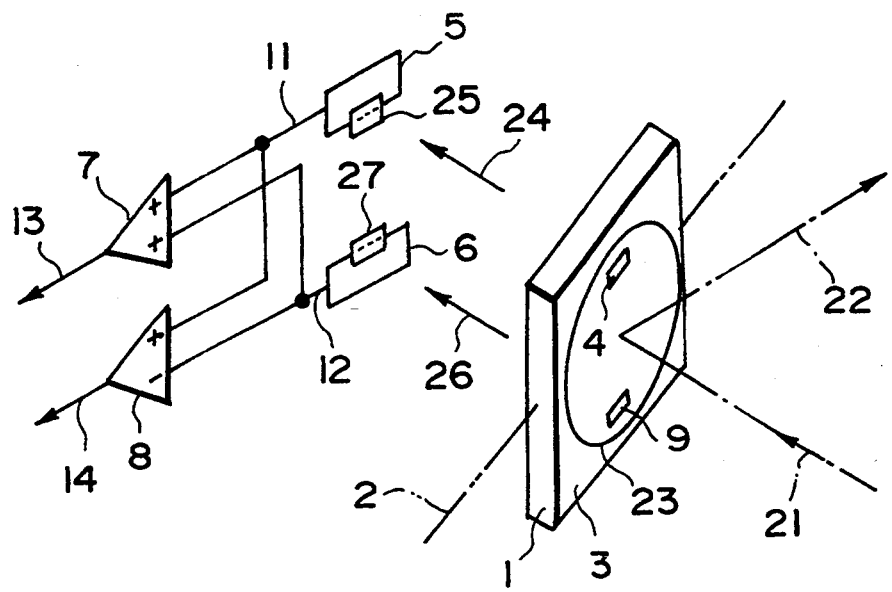

FIG. 4 shows another embodiment of a galvano mirror used in an optical information recording/reproduction apparatus of the present invention. In this embodiment, two transmission openings 4 and 9 are formed at symmetrical positions on a mirror surface of a galvano mirror 1 to be separated by equal distances in a direction perpendicular to a rotational axis 2 of the mirror 1. Transmitted light components (beam) 24 and 26 from the transmission openings 4 and 9, respectively, have spatial patterns 25 and 27, and these spatial patterns are partially received by sensors 5 and 6. As described above, APC control of a semiconductor laser as a light source is performed based on a sum signal 13 of outputs 11 and 12 from these sensors, and the rotational angle of the galvano mirror is detected based on a difference signal 14 between the outputs 11 and 12.

If incident light components 21 do not have a uniform intensity distribution but have a Gaussian distribution, the influence of the intensity distribution in the $Z_0$-axis direction in the spatial pattern 25 appears in the sum signal 13 in the embodiment shown in FIG. 3. However, in the embodiment shown in FIG. 4, the influence can be effectively canceled.

Figure 2:
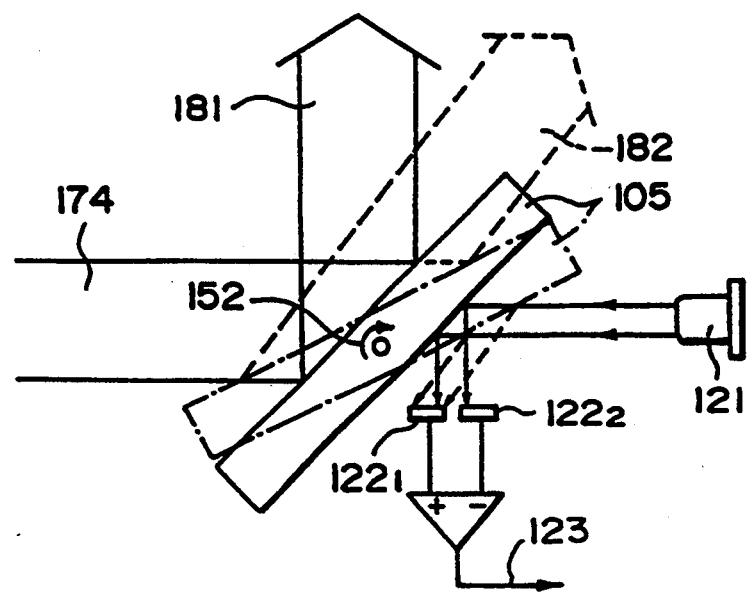
FIG. 2 is a view showing a means for detecting a rotational angle of a galvano mirror.
Figure 5:
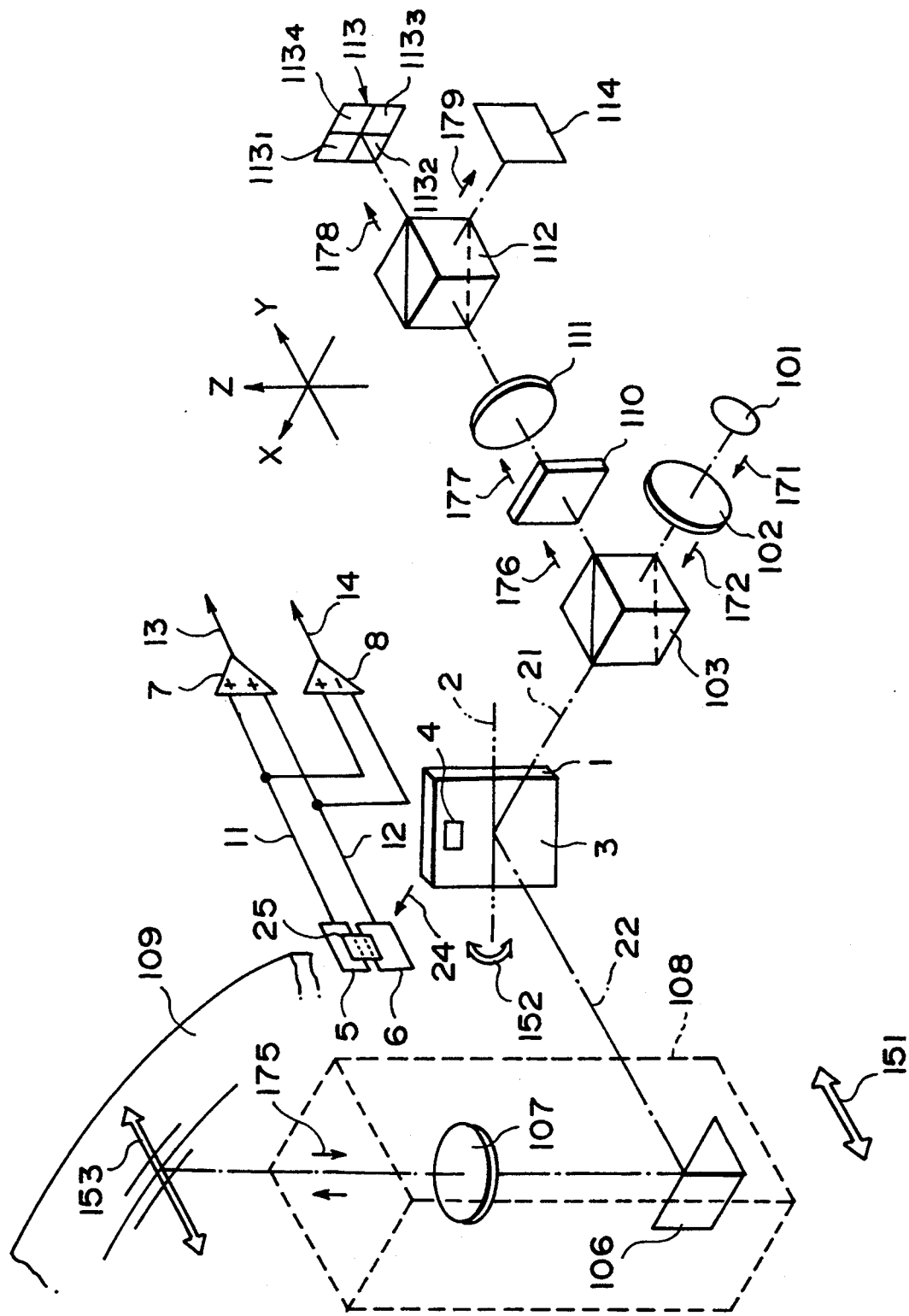
FIGS. 5, 7, and 16 are views for explaining optical systems for optical information recording/reproduction apparatuses using the galvano mirrors of the present invention.

FIG. 5 shows the overall optical system for an optical information recording/reproduction apparatus, which system employs the galvano mirror 1 shown in FIG. 2.

The same reference numerals in FIG. 5 denote the same parts as in FIG. 1, and a detailed description thereof will be omitted. Light components 21 from a semiconductor laser 101 are reflected by the galvano mirror 1 having the rotational axis 2, and are converted into light components 22 propagating toward an objective lens 107. The opening 4 is formed on the mirror surface 3 of the galvano mirror 1, and some of the incident light components 21 reach the sensors 5 and 6 via the opening 4. The sum signal 13 and the difference signal 14 of the outputs 11 and 12 from the sensors 5 and 6 are determined on the basis of the area of the spatial pattern 25 of light component 24 projected on the sensors 5 and 6. The area of the spatial pattern 25 is changed when the galvano mirror 1 is rotated in a direction of an arrow 152 about the rotational axis 2 so as to perform AT control. In this manner, APC control, and detection of the rotational angle of the galvano mirror 1 can be performed. Of course, the galvano mirror shown in FIG. 4 may be used in the apparatus shown in FIG. 5.

As described above, according to the present invention, in an optical system for an optical information recording/reproduction apparatus, which system is arranged so that when light is converged on an optical recording medium for optically or optomagnetically recording and/or reproducing information through an objective lens, light emitted from a light source is focused on a recording surface of the recording medium via a polarization beam splitter and the objective lens, and light reflected by the recording surface is projected onto a photodetector via the objective lens and the polarization beam splitter, and which system pivot-controls a galvano mirror arranged between the polarization beam splitter and the objective lens so as to perform AT control, a transmission opening is formed in the galvano mirror, and light components transmitted from the light source side via the opening are received by a sensor, the rotational angle of the galvano mirror is detected based on an output signal from the sensor, and the light amount of the light source is detected based on the output signal.

More specifically, a transmission opening is formed on the galvano mirror to be separated in a direction perpendicular to the rotational axis, and light components transmitted from the light source side via the opening are received by a plurality of sensors. The rotational angle of the galvano mirror is detected based on a difference signal between the outputs from the two sensors, and the light amount of the light source is detected based on a sum signal of the outputs from the sensors.

Therefore, since light transmitted through the transmission opening corresponds to some components of light propagating toward the recording medium, when the light amount is measured based on these light components, a stable, correct value can be obtained without being influenced by changes in transmittance, reflectance, and absorption coefficient over time of a film of the polarization beam splitter, or the environmental temperature or humidity. In addition, when the galvano mirror is inclined, the position of the transmission opening is displaced, and a difference signal between the outputs from the sensors is obtained. Thus, even when the galvano mirror is arranged in a stationary optical system side, correction for AT control can be performed.

As described above, according to the present invention, some of the light components propagating from the polarization beam splitter toward the recording medium are extracted from the opening of the galvano mirror, and are detected by the photodetector, thereby obtaining an APC control signal. As a result, the light amount can be precisely detected. Since the rotational angle of the galvano mirror can be detected by a simple arrangement without requiring a special light source, an offset of an AT control signal caused upon rotation of the galvano mirror can be eliminated. In addition, a compact, low-cost system can be realized.

Still another embodiment of a galvano mirror used in an optical information recording/reproduction apparatus of the present invention will be described in detail below with reference to FIG. 6. The following description will be made on the basis of an $X_0$-$Y_0$-$Z_0$ three-dimensional coordinate system. A galvano mirror 1 is subjected to rotation control about a rotational axis 2 (means for rotation is not shown). Light components 21 from a semiconductor laser propagate in the negative direction of the $X_0$ axis, and are reflected by a mirror surface 3 of the galvano mirror 1 to be converted into reflected light components 22 propagating toward an objective lens arranged in the positive direction of the $Y_0$ axis. Assuming a projection region 31 in an initial state of reflected light components, photodetectors, i.e., two rectangular sensors 32 and 33 are arranged on an imaginary plane 30 crossing light components propagating from the galvano mirror 1 toward the objective lens so as to be adjacent to the boundary of the projection region 31, to be point-symmetrical about the optical axis of the objective lens, and to be separated from each other by a predetermined distance in a direction perpendicular to the rotational axis of the galvano mirror 1. More specifically, the sensors 32 and 33 are juxtaposed in the $Z_0$-axis direction in which reflected light components are deflected. Note that the intensity distribution of the reflected light components 22 on the projection region 31 is assumed to be line-symmetrical about both an axis parallel to the $X_0$ axis passing through the center of the projection region, and an axis parallel to the $Z_0$ axis passing through the center of the projection region (e.g., a Gaussian distribution). Outputs 34 and 35 obtained by photoelectric conversion in the two sensors are supplied to a sum signal calculation unit 36 and a difference signal calculation unit 37, thereby generating a sum signal 38 and a difference signal 39.

In this arrangement, when the galvano mirror 1 is rotated about the rotational axis 2 to perform AT control, the reflected light components 22 are deflected in a direction almost parallel to the $Z_0$ axis, and as a result, the magnitudes of the outputs 34 and 35 from the sensors 32 and 33 are changed. For example, when the reflected light components 22 are deflected in the positive direction of the $Z_0$ axis, the output 34 is increased, and the output 35 is decreased. However, as described above, due to the symmetricity of the intensity distribution, and the symmetricity of the sensor arrangement, the absolute values of the change amounts of the outputs 34 and 35 are almost equal to each other. Therefore, the sum signal 38 obtained by the sum signal calculation unit 36 based on the outputs 34 and 35 is not influenced by rotation of the galvano mirror 1. In other words, the sum signal 38 is changed when the light amount of the reflected light component 22 is changed, and can be used as a stable APC signal. On the other hand, since the difference signal 39 is sensitively changed upon rotation of the galvano mirror 1, it can be used as a signal for detecting the rotational angle of the galvano mirror 1, and an offset of an AT control signal can be corrected.

Figure 6:
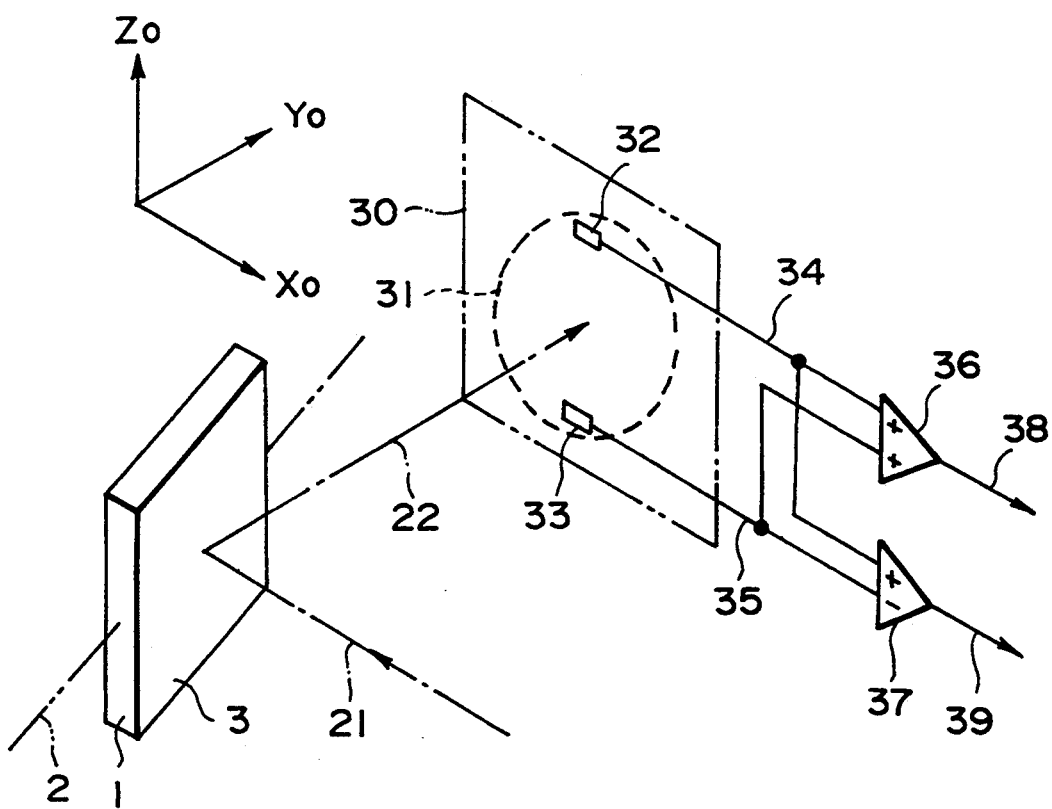
Figure 7:
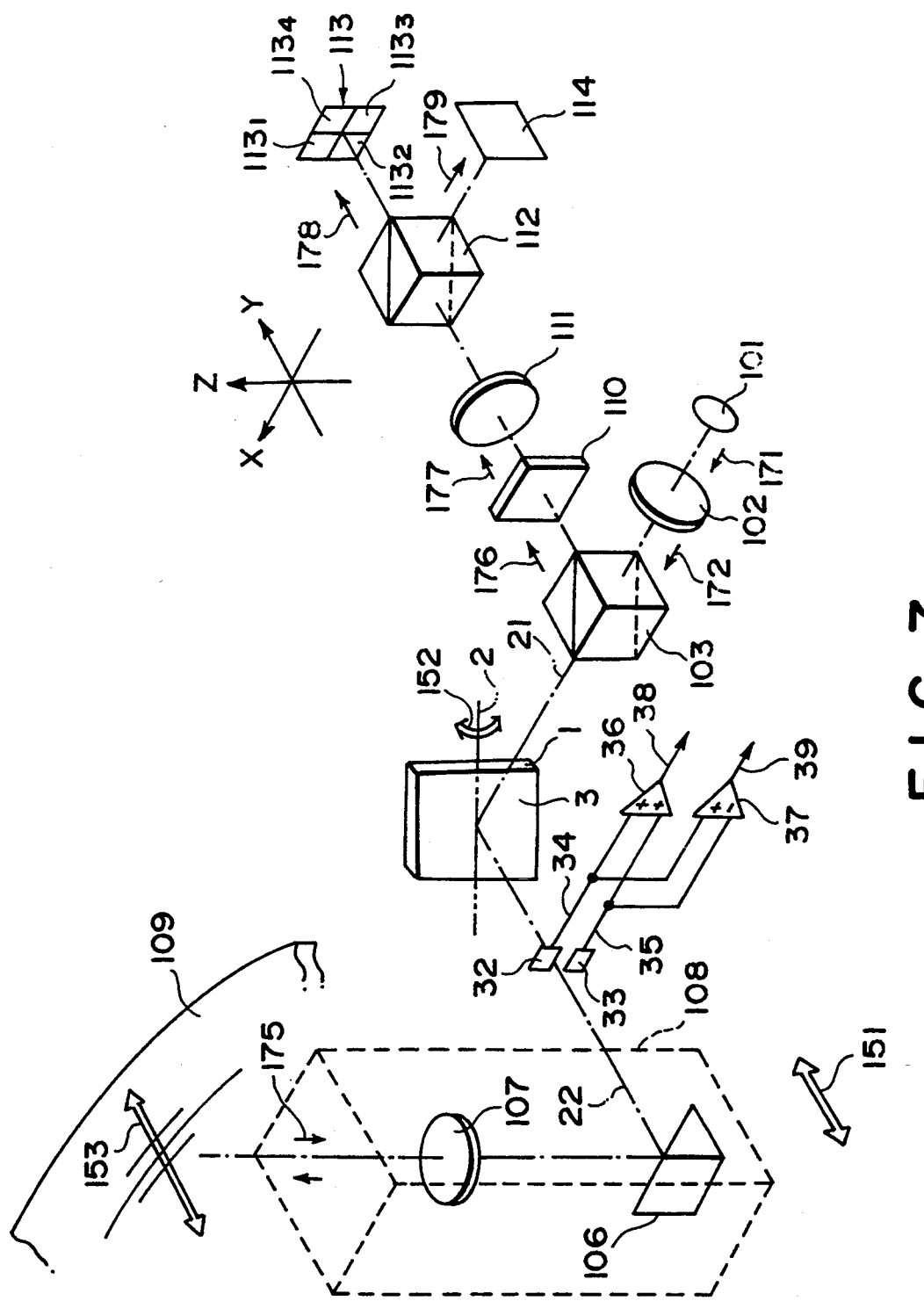

FIG. 7 shows the overall optical system for an optical information recording/reproduction apparatus, which system employs the galvano mirror 1 shown in FIG. 6. The same reference numerals in FIG. 7 denote the same parts as in FIG. 5, and a detailed description thereof will be omitted. The optical system is a separated optical system separated into a movable optical system 108 and a stationary optical system. Light components 21 emitted from a semiconductor laser 101 are reflected by the galvano mirror 1 having the rotational axis 2, and are converted into light components 22 propagating toward an objective lens 107. The sensors 32 and 33 are arranged on the stationary optical system side at a middle position between the galvano mirror 1 and the movable optical system 108. According to the gist of the present invention, the sensors 32 and 33 may be arranged in the movable optical system. When the sensors are arranged in the stationary optical system, as described above, the following merits can be obtained. More specifically, first, since the movable optical system can be rendered light in weight, it is convenient to attain high-speed access in a direction of an arrow 151. Second, since the displacement in the Y-axis direction of the reflected light components 22 on the sensors 32 and 33 upon rotation of the galvano mirror 1 is proportional to the distance between the galvano mirror 1 and the sensors 32 and 33, if the sensors are arranged in the movable optical system 108, a differential output 39 varies depending on the Z-axis position of the movable optical system 108 even if the rotational angle of the galvano mirror 1 in a direction of an arrow 152 remains the same. Therefore, the distance between the galvano mirror 1 and the movable optical system 108 must be detected using a proper means. However, when the two sensors are arranged in the stationary optical system, as described above, no additional means is required, and the arrangement can be simplified.

As described above, according to the present invention, in an optical system for an optical information recording/reproduction apparatus, which system is arranged so that, when light is converged onto an optical recording medium via an objective lens so as to optically or optomagnetically record and/or reproduce information, light from a light source is focused on a recording surface of the recording medium via a polarization beam splitter and the objective lens, and light reflected by the recording surface is projected onto a photodetector via the objective lens and the polarization beam splitter, and in which a galvano mirror arranged between the polarization beam splitter and the objective lens is subjected to pivot control for AT control, sensors are arranged to be located between the objective lens and the galvano mirror, to be point-symmetrical about an optical axis of the objective lens, and to be separated from each other by a predetermined distance in a direction perpendicular to the rotational axis of the galvano mirror, the light projected from the light source side is received by the sensors, the rotational angle of the galvano mirror is detected based on output signals from the sensors, and the light amount of the light source is detected based on the output signals.

More specifically, two sensors are arranged to be located between the objective lens and the galvano mirror, to be point-symmetrical about an optical axis of the objective lens, and to be separated from each other by a predetermined distance in a direction perpendicular to the rotational axis of the galvano mirror, the light projected from the light source side is received by the sensors, the rotational angle of the galvano mirror is detected based on a difference signal between outputs from the sensors, and the light amount of the light source is detected based on a sum signal of the outputs.

Still another embodiment of the present invention will be described hereinafter.

This embodiment exemplifies an optical information recording/reproduction apparatus having a separated head in which a tracking operation in a low-frequency region is performed by a linear motor, and a tracking operation in a high-frequency region is performed by a galvano mirror.

In an optical information recording/reproduction apparatus, e.g., in an optical disk apparatus, focusing and tracking operations are performed by moving a movable portion including an objective lens in an optical head by an actuator. The optical head can be roughly classified into a separated head in which an actuator unit is moved in the radial direction of a disk to be separated from a laser light source unit, and an integrated head in which an actuator unit is moved in the radial direction of a disk together with a laser light source unit. Since the separated head can easily realize a lightweight structure of the movable portion, and can easily obtain a large acceleration as compared to the integrated head, it is advantageous for a high-speed seek operation. In some separated heads, in order to realize a further lightweight structure of the movable unit, a tracking operation in a low-frequency region is performed by a linear motor, and a tracking operation in a high-frequency region is performed by a galvano mirror.

Figure 8:
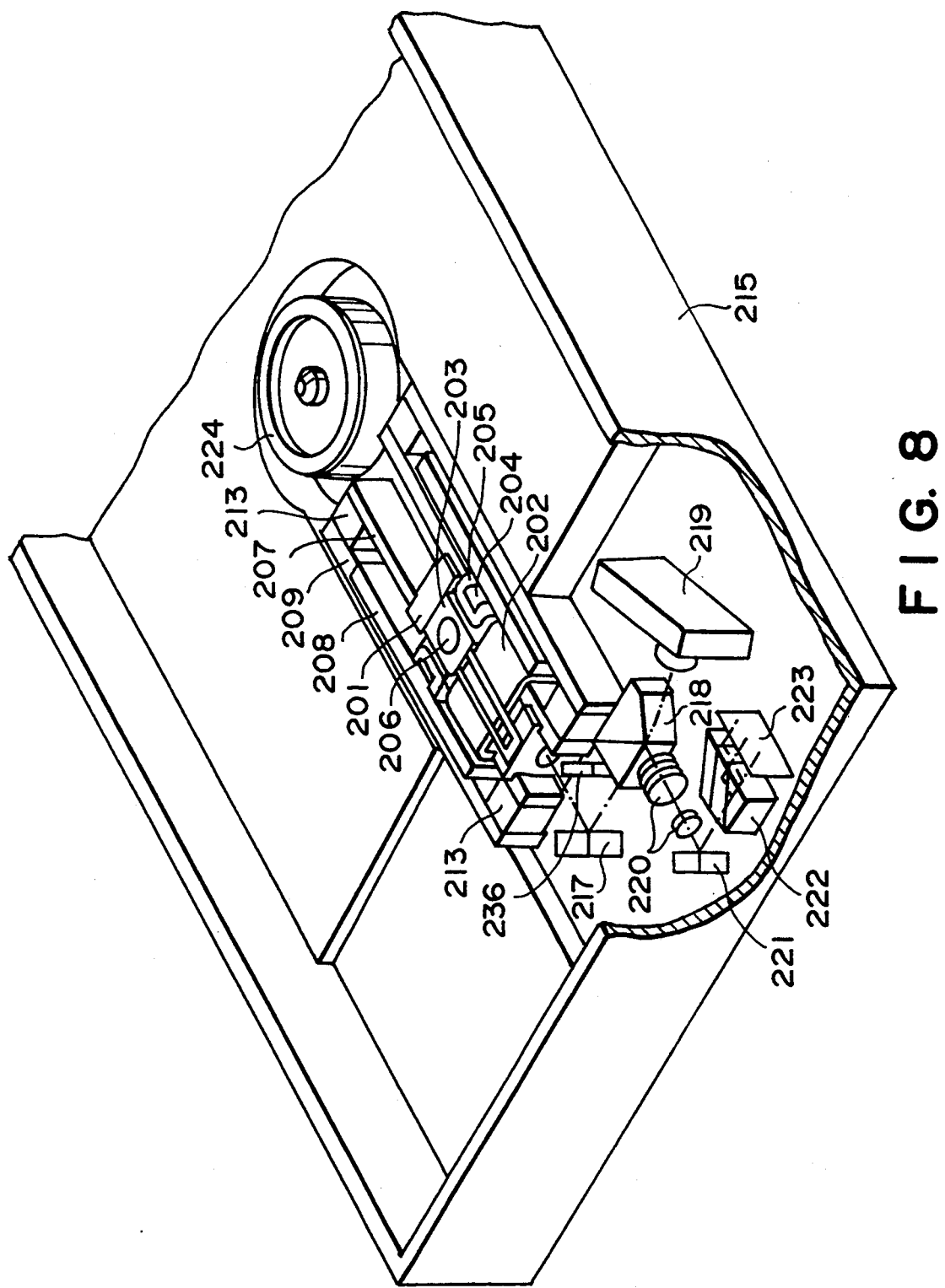
FIG. 8 is a partially cutaway perspective view for explaining an arrangement of an optical information recording/reproduction apparatus according to an embodiment of the present invention.
Figure 9:
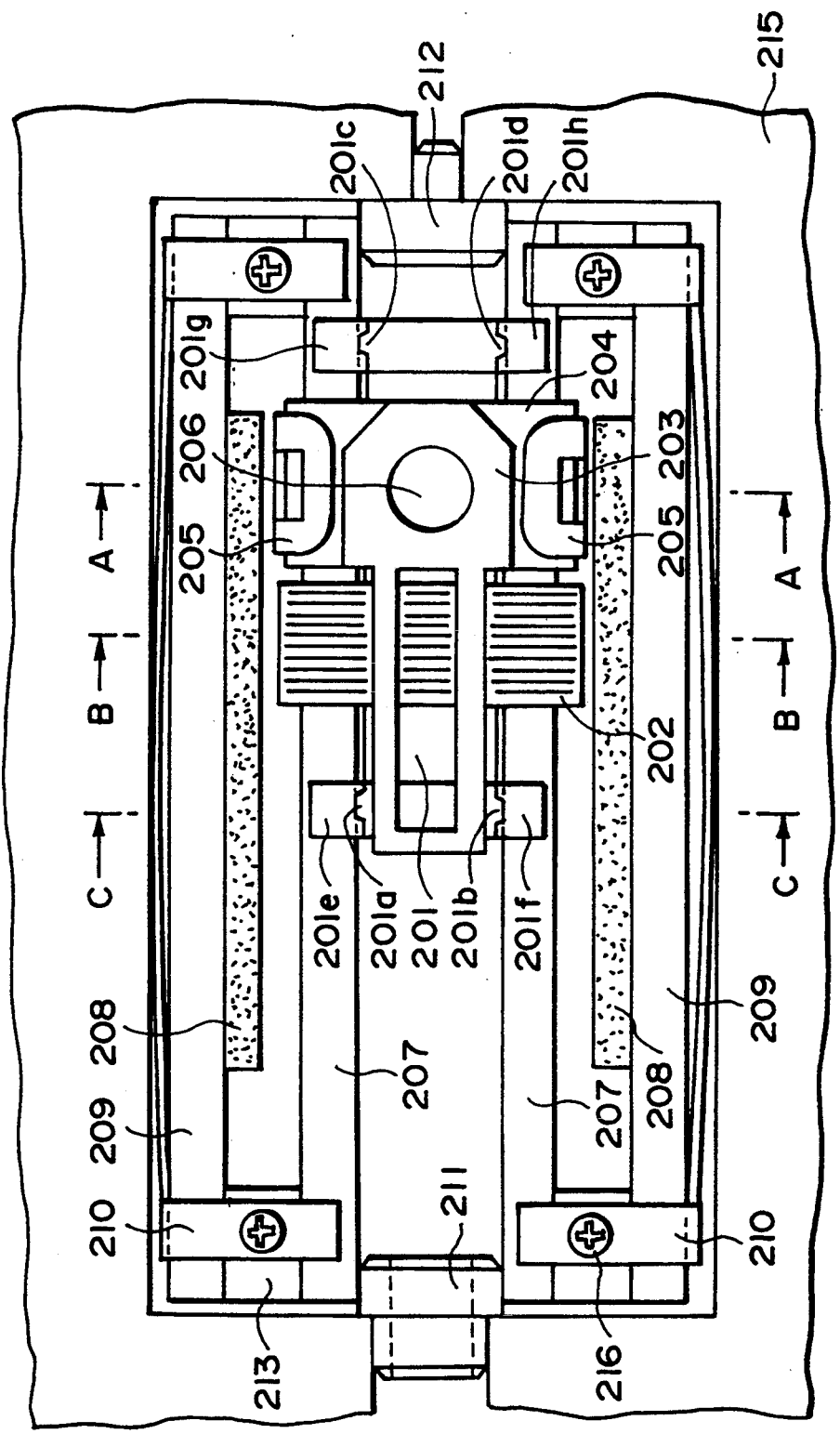
FIG. 9 is a partial plan view showing a linear motor unit of an optical head in the embodiment shown in FIG. 8.

FIG. 8 is a partial cutaway perspective view for explaining an arrangement of an optical information recording/reproduction apparatus according to the embodiment of the present invention, and FIG. 9 is a partial plan view showing a linear motor unit of an optical head of the apparatus shown in FIG. 8. FIGS. 10, 11, and 12 are respectively sectional views taken along lines A—A, B—B, and C—C in FIG. 9.

In FIGS. 8 to 12, an objective lens 206 is held by a holder 204, and a focus coil 205 is attached to the holder. The objective lens holder 204 is attached to a carriage 201 via a parallel leaf spring 203 to be movable in a direction substantially parallel to a focus direction. A seek coil 202 is attached to the carriage 201. The carriage 201 is supported by two parallel rod-like inner yokes 207 to be slidable in the longitudinal direction of the yokes. The inner yokes 207 constitute a magnetic circuit together with joint yokes 213, outer yokes 209, and magnets 208. The two inner yokes are aligned by spacers 211 and 212. This alignment is attained by the biasing forces of leaf springs 210 arranged between a base 215 and the outer yokes 209. After the leaf springs align the inner yokes by their biasing forces, they are fixed to the base 215 by screws 216. In this manner, the magnetic circuit is fixed to the base 215. Each of the spacers 211 and 212 has a rod-like shape, can have high outer-diameter precision, and hence, can maintain an interval between the inner yokes 207 with high precision. A hole for allowing a recording or reproduction laser beam to pass therethrough is formed at the center of the spacer 211.

As shown in FIG. 8, a laser beam emitted from a laser light source 219 passes through a prism 218, so that its beam pattern is shaped. Thereafter, the laser beam is reflected by a galvano mirror 217, and passes through the hole of the spacer 211. Then, the optical path of the laser beam is deflected upward by a lift-up mirror 214 (FIG. 10) mounted on the carriage 201, and passes through the objective lens 206, thus forming a light spot on an optical disk as an optical information recording medium (not shown). The laser beam reflected by the optical disk is returned to the prism 218 along the same path, and is reflected by the prism toward a focusing lens 220, and is then split into three optical paths by a prism 222 via a mirror 221. The three-split beams then reach a sensor 223. Note that a spindle motor 224 rotates the optical disk.

It is important to make the optical path of the laser beam be parallel to the moving path of the carriage 201. In this embodiment, since the inner yokes 207 also serve as slide guides, a mounting surface of the inner yokes 207 to the base 215, and a mounting surface of optical members such as the prisms 218 and 222, and the like can be in the same plane, and alignment can be realized with high precision.

FIG. 13 is a perspective view showing an arrangement of a drive means for the galvano mirror 217. The galvano mirror is fixed to a leaf spring 231, and two ends of the leaf spring are fixed to the base 215. Therefore, the galvano mirror 217 is swingable in a direction of an arrow in FIG. 13. A coil 235 is attached to the galvano mirror 217. On the other hand, a yoke 232 is fixed to the base 215. A magnet 234 is mounted on the yoke via a holder 233. The magnet, the magnet holder 233, and the yoke 232 constitute a magnetic circuit. When the coil 235 is energized, currents of the coil 235 cross magnetic fields produced in two gaps between the magnet 234 and the upper and lower ends of the yoke 232 in opposite directions in the upper and lower gaps. Therefore, the galvano mirror 217 is swung in the direction of the arrow by a force acting on the coil 235.

FIG. 14 is a perspective view showing an arrangement for detecting the rotational angle of the galvano mirror 217. An auxiliary mirror 236 is fixed to the base 215 to oppose the galvano mirror 217. A light-emitting element 237, a lens 238, and a detection element 239 such as a PSD are also arranged. Note that a line L—L indicates an optical path of the recording or reproduction laser beam.

Figure 15:
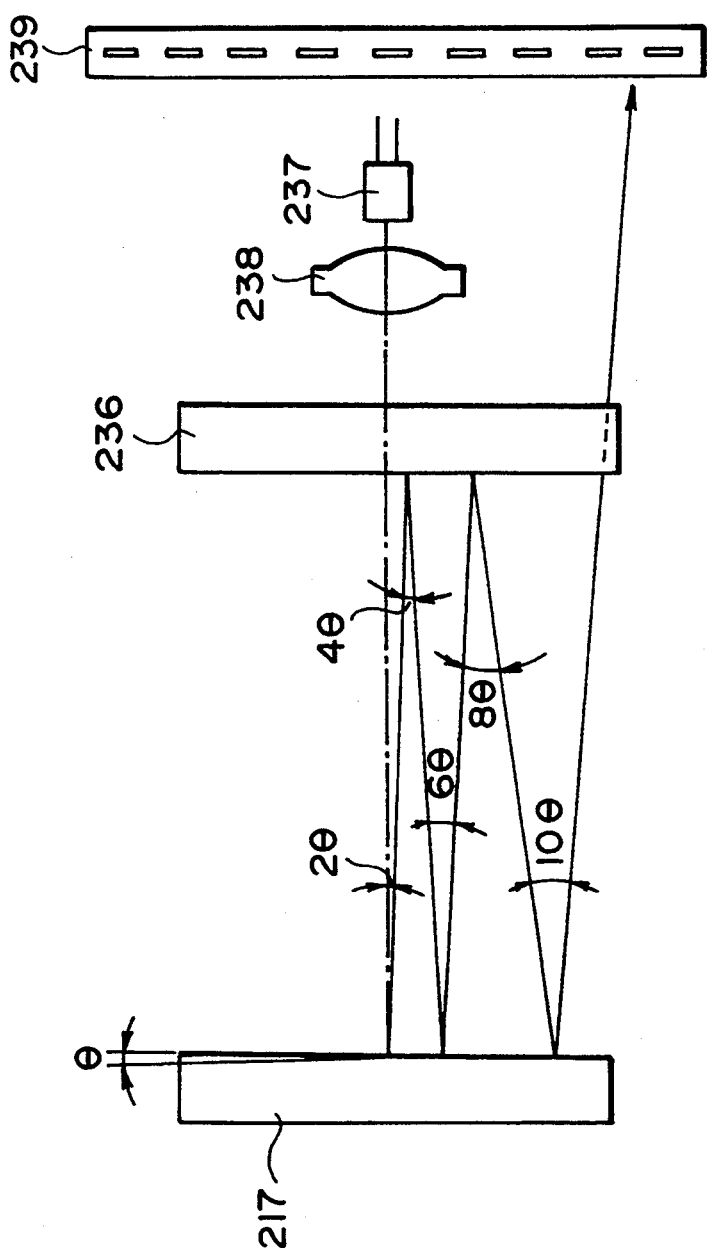
FIG. 15 is a view when viewed from a direction of an arrow A in FIG. 14.

A beam emitted from the light-emitting element 237 and passing through the lens 238 is repetitively reflected by the galvano mirror 217 and the auxiliary mirror 236, and then reaches the detection element 239. Even when the galvano mirror 217 is swung in the direction of the arrow in FIG. 13, since the horizontal positional relationship is left unchanged, a light incident position to the detection element 239 is constant regardless of the swing angle of the galvano mirror 217. In this case, a vertical incidence position of the beam to the detection element 239 is changed according to the swing angle of the galvano mirror 217. That is, when the galvano mirror 217 is swung upward, light is incident on the upper portion of the detection element 239, and when it is swung downward, light is incident on the lower portion of the detection element 239. FIG. 15 shows a state wherein a displacement is amplified by repetitive reflections.

FIG. 15 is a view when FIG. 14 is viewed from a direction of an arrow A, i.e., a view obtained when the opposing galvano mirror 217 and auxiliary mirror 236 are viewed from sideways in the horizontal direction. Light projected from the light-emitting element 237 passes through the lens 238, and is then reflected by the galvano mirror 217 inclined at an angle $\theta$ so as to be inclined at an angle $2\theta$. Thereafter, every time the light is reflected by the auxiliary mirror 236 and the galvano mirror 217, the inclination angle is increased, and the light is amplified to have a sufficiently detectable displacement. Thereafter, the light is incident on the detection element 239.

In this embodiment, the reflection surface for the recording or reproduction laser beam of the galvano mirror 217 is used for detecting the rotational angle of the galvano mirror. Another reflection surface for rotational angle detection may be formed on the galvano mirror in addition to the reflection surface for the recording or reproduction laser beam.

Tracking and focusing operations will be described below. When the seek coil 202 is energized via a flexible cable (not shown), since a current flows in a direction perpendicular to a horizontal magnetic field produced by the magnetic circuit constituted by the inner yokes 207, the magnets 208, the outer yokes 209, and the joint yokes 213, the seek coil 202 receives a force in the longitudinal direction of the inner yokes 207, thereby driving the carriage 201 (coarse tracking). At the same time, a fine tracking operation is performed upon a swing movement of the galvano mirror 217. In this case, the rotational angle of the galvano mirror is detected, as described above, and offset correction is performed. In this case, since the carriage 201 is guided while being brought into contact with the inner yokes 207 by projections 201a, 201b, 201c, and 201d, and is swung while its horizontal movement is regulated, a swing error caused by attachment due to high humidity or dust can be prevented. Wing portions 201e, 201f, 201g, and 201h of the carriage are guided by the inner yokes 207, and hence, the carriage is moved while its vertical movement is regulated. As shown in FIG. 12, the upper and lower surfaces of each inner yoke 207 are tapered, and the right and left end portions of the carriage 201 are brought into contact with the inner yokes 207. Therefore, the carriage 201 can be easily held in the horizontal direction. When the focus coil 205 is energized, a current flows in a direction perpendicular to a horizontal magnetic field, and the focus coil 205 receives a vertical force. Thus, the objective lens unit supported by the parallel leaf spring 203 is moved in the vertical direction.

As described above, according to the present invention, in an optical information recording/reproduction apparatus having an optical head for performing a tracking operation using a galvano mirror, an auxiliary mirror is arranged to oppose the galvano mirror, so that a light beam from a light source is repetitively reflected by the galvano mirror and the auxiliary mirror, and thereafter, is detected, thereby detecting the rotational angle of the galvano mirror.

As described above, according to the present invention, since a large optical path is assured by a plurality of times of repetitive reflections by the galvano mirror and the auxiliary mirror, the rotational angle of the galvano mirror can be converted into a large displacement, and the displacement can be measured. In this manner, high galvano mirror rotational angle detection precision can be obtained by a compact system.

Still another embodiment of the present invention will be described in detail below with reference to FIGS. 16 to 18.

Figure 16:
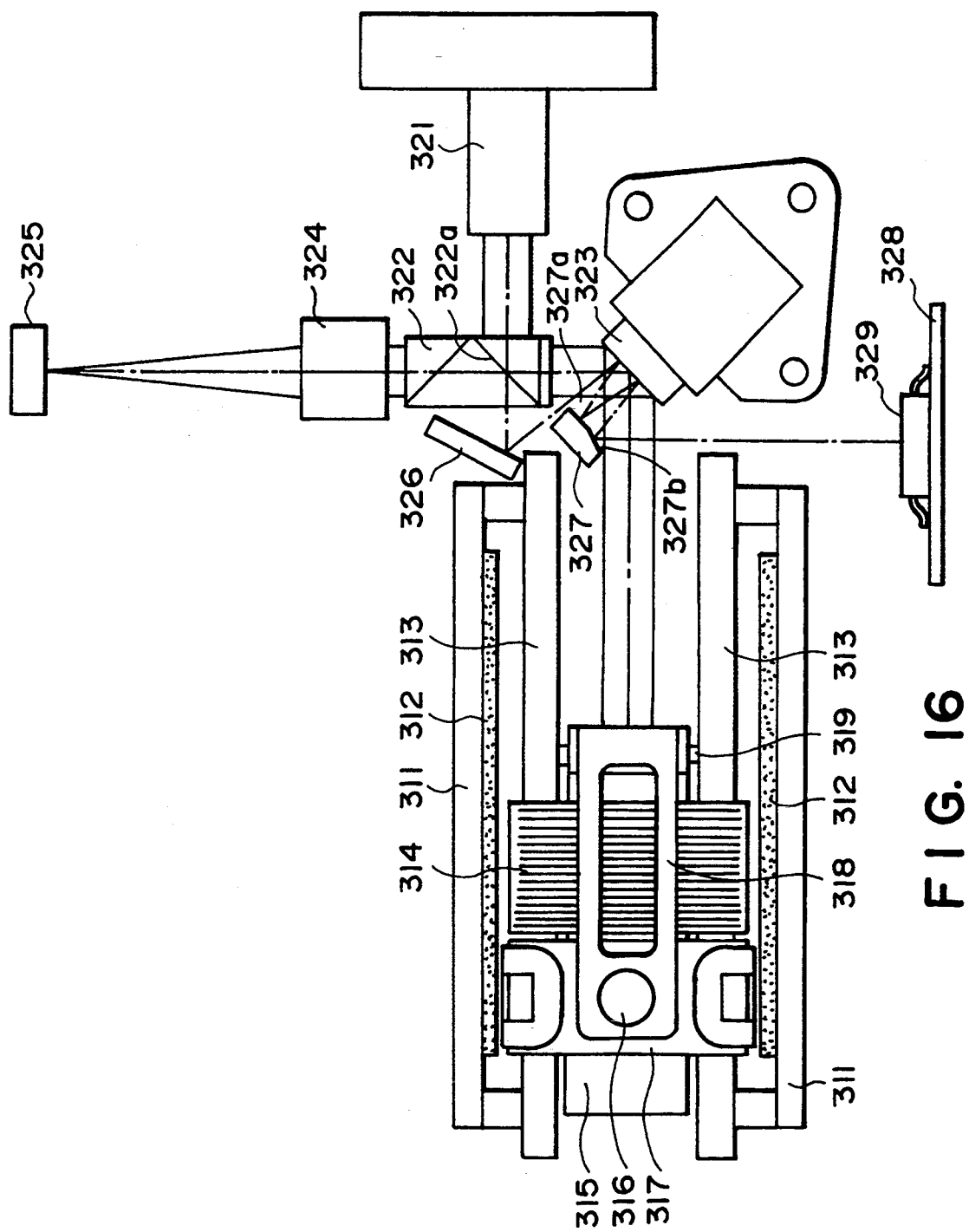

FIG. 16 is a plan view showing a principal part of a separated optical information recording/reproduction apparatus. Outer yokes 311, permanent magnets 312, and inner yokes 313 are parallelly and right-to-left symmetrically arranged in the radial direction of an optical disk as an optical information recording medium, and constitute a magnetic circuit. In a movable optical head, a carriage 315 having a tracking coil 314, and an actuator 317 having an objective lens 316 are juxtaposed in the front-to-back direction, and are coupled through a leaf spring 318. The two inner yokes 313 are inserted through ring structures of the tracking coil 314 and the actuator 317.

V-shaped grooves (not shown) are formed on the inner side surfaces of the inner yokes 313, and on the outer side surfaces of the carriage 315, and a ball 319 are arranged in these grooves. With this arrangement, the carriage 315 is supported to be movable in the radial direction of the optical disk, i.e., along the inner yokes 313, and the actuator 317 is driven in the front-to-back direction by a linear motor constituted by the tracking coil 314 and the magnetic circuit.

An optical system for guiding a laser beam toward the optical head is arranged behind the magnetic circuit. A beam splitter 322 and a galvano mirror 323 are arranged in turn along an optical path extending from a laser light source 321 to the optical head. More specifically, light transmitted through the beam splitter 322 is guided to a rotational angle detection mechanism, and light reflected by a half mirror 322a of the beam splitter 322 is guided to the optical head via the galvano mirror 323. Light returned from the optical head is guided to a focusing lens 324 and a sensor 325 via the galvano mirror 323 and the beam splitter 322.

The rotational angle detection mechanism comprises a first mirror 326, the galvano mirror 323, a second mirror 327 which has two reflection surfaces 327a and 327b, and in which the reflection surface 327a is arranged to be parallel to the neutral position of the galvano mirror 323, and a light-receiving element 329 fixed to a fixing substrate 328 having a fixing elongated hole 328a (FIG. 17). These components are arranged along the optical path in the order named.

In the above arrangement, a laser beam emerging from the laser light source 321 is reflected by the half mirror 322a of the beam splitter 322, and the galvano mirror 323 pivoted through a predetermined angle, and then reaches the optical head. The laser beam incident on the optical head is reflected by a mirror (not shown), and is then focused on the optical disk by the objective lens 316. The laser beam reflected by the optical disk is returned to the galvano mirror 323 along the same path, and is transmitted through the half mirror 322a of the beam splitter 322. Thereafter, the laser beam is focused on the sensor 325 by the focusing lens 324, and is detected as a signal.

A laser beam emerging from the laser light source 321 and transmitted through the half mirror 322a is guided to the rotational angle detection mechanism. More specifically, the laser beam incident on the galvano mirror 323 via the first mirror 326 is reflected a plurality of times between the second mirror 327 and the galvano mirror 323. In this case, as shown in FIG. 18, a rotational angle $\theta$ of the galvano mirror 323 is amplified every time the beam is repetitively reflected between the two mirrors 323 and 327, and is enhanced to $8\theta$ in FIG. 18. Since the laser beam whose rotational angle is amplified emerges in a direction of the light-receiving element 329 to have a sufficient optical path length, its direction is largely changed by the other reflection surface 327b of the second mirror 327. The product of the rotational angle and the optical path length represents a lateral displacement, and the rotational angle θ can be detected as a light-receiving position of the light-receiving element 329.

Since the rotational angle detection mechanism enhances the rotational angle, the mounting errors of the first and second mirrors 326 and 327 are also enhanced. For this reason, the fixing elongated hole 328a is formed in the fixing substrate 328 having the light-receiving element 329, and the light-receiving element 329 is fixed to a main body of the optical information recording/reproduction apparatus by a screw 330 while adjusting the fixing position, thereby canceling the mounting errors of the mirrors.

As described above, according to the present invention, a laser beam from a laser light source is split into two beams by a light splitting member, one of the two-split laser beams is received by a detector via a galvano mirror, and the rotational angle of the galvano mirror is detected based on the incident position of the beam.

As described above, according to the present invention, since a laser beam is split into two beams by the light splitting member, and one laser beam is detected as a displacement of the detector via the galvano mirror, the rotational angle of the galvano mirror can be detected in a narrow space, and no light-emitting element for detecting the rotational angle is required, thus realizing a compact apparatus.

Figure 20:
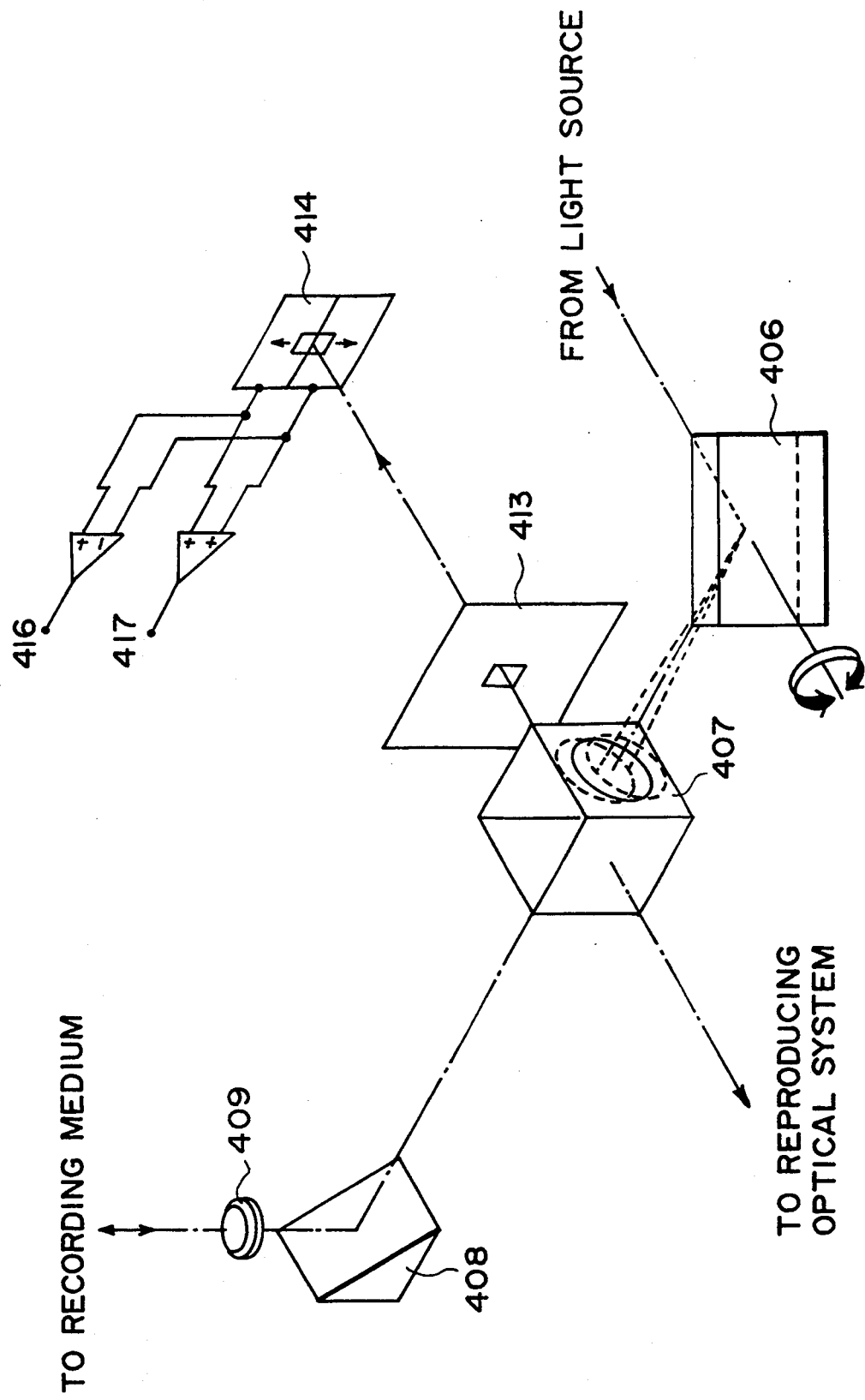
FIG. 20 is an enlarged perspective view of a pivotal angle detection unit of a galvano mirror.

FIG. 19 is a plan view for explaining an embodiment of an optical head used in the optical information recording/reproduction apparatus of the present invention. FIG. 19 explains a state in a plane parallel to a medium surface of an information recording medium. FIG. 20 is an enlarged perspective view of a pivot angle detection unit of a galvano mirror in the optical head shown in FIG. 19.

The optical head includes a semiconductor laser 401 serving as a light source for recording and/or reproducing information, a collimator lens 402 for converting light components emerging from the semiconductor laser 401 into parallel light components, a polarization beam splitter 1 (PBS1) 403, a focusing lens 404, a servo detector 405 for detecting an AT signal and/or an AF signal, a galvano mirror 406, a polarization beam splitter 2 (PBS2) 407, a mirror 408, an objective lens 409, an optomagnetic disk 410 as an information recording medium, an analyzer 411, an RF detector 412 for detecting a reproduction signal, a rectangular aperture 413, and a two-split photodetector 414. The servo detector 405 detects an AF servo signal and an AT servo signal for focusing a light spot, which is formed on the information recording medium by the objective lens 409, on a predetermined information recording track on the information recording medium, and/or for following the track.

A recording or reproduction light beam from the light source 401 is amplitude-split by the PBS2 arranged in the optical path extending to the objective lens 409 via the PBS1 and the galvano mirror 406. A light beam split and reflected by the PBS2 passes through the aperture 413, and is incident on the two-split photodetector 414. The split line of the two-split photodetector 414 is substantially perpendicular to a deflection direction of the light beam by the galvano mirror 406 (i.e., a tracking direction). The rectangular aperture 413 is arranged in the optical path between the PBS2 and the two-split photodetector 414, and near the PBS2, and one of two sets of parallel sides of the rectangular aperture is substantially parallel to the split line of the two-split photodetector 414. A difference signal 416 between signals from two detectors of the two-split photodetector 414 is utilized as a pivot angle detection signal of the galvano mirror, and a sum signal 417 of the two signals is utilized as a front monitor, i.e., a front APC signal of the light source (semiconductor laser).

A light beam emerging from the galvano mirror 406 is split by the PBS2, and a reflected light beam is incident on the two-split photodetector 414 via the rectangular aperture 413. This light beam is deflected by the galvano mirror 406, and is moved on the two-split photodetector 414 according to an AT servo operation. Therefore, as described above, if a differential signal of two output signals from the two-split photodetector 414 is calculated, the pivot angle of the galvano mirror can be detected. Since this light beam is an output itself of the semiconductor laser, a front monitor operation of the light source output can be attained using the sum signal of the two-split photodetector 414.

A light beam transmitted through the PBS2 reaches the information recording medium 410 via the mirror 408 and the objective lens 409. The light reflected by the medium 410 is returned to the PBS2 again via the objective lens 409 and the mirror 408. Some components of the returned light beam are reflected by the PBS2, and are incident on the RF detector 412 via the focusing lens 404 and the analyzer 411, thereby reproducing a recorded information signal of the information recording medium 410. Of the light beam returned from the information recording medium 410, light components transmitted through the PBS2 reach the PBS1 through the galvano mirror 406 again, and are reflected by the PBS1. The light components reflected by the PBS1 are incident on the servo detector 405 via the focusing lens 404, thus providing a servo signal.

The above embodiment assumes an optical system for an optical head corresponding to a servo method when a continuous guide groove is formed in the information recording medium 410.

FIG. 21 is a plan view showing another embodiment of an optical head used in the optical information recording/reproduction apparatus of the present invention. FIG. 21 explains a state in a plane parallel to a medium surface of an information recording medium. The same reference numerals denote members having the same functions as those described with reference to FIGS. 19 and 20, and a detailed description thereof will be omitted.

The optical head includes a semiconductor laser 401 serving as a light source for recording and/or reproducing information, a collimator lens 402 for converting light components emerging from the semiconductor laser 401 into parallel light components, a focusing lens 404, a servo/RF detector 415, a galvano mirror 406, a polarization beam splitter (PBS) 407, a mirror 408, an objective lens 409, an optical disk 410 as an information recording medium, an analyzer 411, a rectangular aperture 413, and a two-split photodetector 414. The detector 415 detects an AF servo signal and an AT servo signal for focusing a light spot, which is formed on the information recording medium by the objective lens 409, on a predetermined information recording track on the information recording medium, and/or for following the track.

A recording or reproduction light beam from the light source 401 is amplitude-split by the PBS 407 in the optical path extending to the objective lens 409 via the galvano mirror 406. The two-split photodetector 414 is arranged at a position where the light beam reflected by the PBS 407 is incident. The split line of the two-split photodetector 414 is substantially perpendicular to a deflection direction of the light beam by the galvano mirror 406 (i.e., a tracking direction). The rectangular aperture 413 is arranged in the optical path between the PBS 407 and the two-split photodetector 414, and near the PBS 407, and one of two sets of parallel sides of the rectangular aperture is substantially parallel to the split line of the two-split photodetector 414. The arrangements of the aperture 413 and the two-split photodetector 414 are the same as those described in the above-mentioned embodiment.

A difference signal between signals from two detectors of the two-split photodetector 414 is utilized as a detection signal of a pivot angle of the galvano mirror, and a sum signal of the signals is utilized as a front monitor, i.e., front APC signal of the light source (semiconductor laser).

A light beam emerging from the galvano mirror 406 is split by the PBS 407, and a reflected light beam is incident on the two-split photodetector 414 via the rectangular aperture 413. This light beam is deflected by the galvano mirror 406, and is moved on the two-split photodetector 414 according to an AT servo operation. Therefore, as described above, if a differential signal of two output signals from the two-split photodetector 414 is calculated, the pivot angle of the galvano mirror can be detected. Since this light beam is an output itself of the semiconductor laser, a front monitor operation of the light source output can be attained using the sum signal of the two-split photodetector 414.

On the other hand, a light beam transmitted through the PBS 407 reaches the information recording medium 410 via the mirror 408 and the objective lens 409, and is reflected by the medium 410. The reflected light beam is returned to the PBS 407 via the objective lens 409 and the mirror 408 again. The returned light beam is reflected by the PBS 407, and the reflected light beam is incident on the servo/RF detector 415 via the focusing lens 404 and the analyzer 411, thereby outputting a recorded information signal of the information recording medium 410 and a servo signal.

This embodiment assumes an optical system for an optical head corresponding to a sample servo method for the information recording medium 410 having no continuous guide groove.

As described above, according to the present invention, a beam splitter is arranged in an optical path along which a recording or reproduction light beam from a light source reaches an objective lens via a galvano mirror. A two-split photodetector is arranged at a position where a light beam emerging from the light source and reflected by the beam splitter via the galvano mirror is incident. The pivot angle of the galvano mirror is detected using output signals from the two-split photodetector. The output signals are also utilized as a front monitor, i.e., front APC signal of the light source (semiconductor laser).

The beam splitter is originally a constituting member for guiding a light beam reflected by an information recording medium to a reproduction signal detection optical signal, and is not a newly introduced member for only the object of the present invention.

A light beam incident on the two-split photodetector is obtained by amplitude-splitting an information recording or reproduction beam by the beam splitter.

The galvano mirror pivot angle detection mechanism of the present invention described above can be realized by attaining composite functions of original constituting members without increasing special-purpose constituting members in addition to minimum necessary constituting members of an optical head. An information reproduction light beam must be inevitably split by a beam splitter to a signal detection optical system in a backward optical path from an information recording medium. At the same time, a light beam is split by the beam splitter in the forward optical path, and is wasted or used as only a front output monitor of a light source in a conventional arrangement. The beam splitter need only be arranged behind the galvano mirror, so that the galvano mirror pivot angle function can be added by utilizing the same light beam.

The following effect can also be expected. Since angle detection can utilize not an edge of a light beam but the entire light beam range, nonlinearity between a pivot angle and a detection signal, and an error appearing in an APC signal depending on pivot movement of the galvano mirror when the same signal is utilized as an APC signal can be avoided. In particular, according to the present invention, since a rectangular aperture is used, a central portion of a light beam range, i.e., a portion having a moderate change in light amount distribution can be extracted and used, and the effect can be emphasized since a rectangular light beam is used.

In the embodiment shown in FIG. 19, the beam splitter for splitting a galvano mirror pivot angle detection light beam also provides a function of splitting an RF signal. Therefore, an angle of a light beam incident on the RF detector is also changed in correspondence with the pivot angle of the galvano mirror. However, if the size of the RF detector is set so that a light beam does not fall outside a light-receiving unit, the above-mentioned change does not pose a problem. On the other hand, since a light beam incident on the servo detector is split after it passes through the galvano mirror again, a change in optical axis according to the pivot angle of the galvano mirror does not occur. Therefore, a problem of movement of an optical axis on the servo detector in the servo method for an information recording medium having a continuous groove can be solved in this method.

In the embodiment shown in FIG. 21, movement of an optical axis on the servo detector due to a sample servo method does not pose a problem. Therefore, since a split operation of a servo/RF light beam, and a split operation of a galvano mirror pivot detection/APC signal light beam can be executed by a single beam splitter, a very compact optical system can be realized.

What is claimed is:

1. An optical system for an optical information recording/reproduction apparatus, comprising:
   a light source;
   an objective lens for focusing a light beam from said light source on a recording medium;
   light beam splitting means arranged between said light source and said objective lens;
   a detector for detecting a light beam reflected from said recording medium and split by said light beam splitting means;
   a galvano mirror for reflecting light from said light beam splitting means to said objective lens, said galvano mirror arranged between said objective lens and said light beam splitting means, said galvano mirror having an opening; and a sensor for receiving the light beam from said light source via the opening, wherein a rotational angle of said galvano mirror is detected on the basis of an output from said sensor.

2. An optical system according to claim 1, wherein a light amount of said light source is detected on the basis of the output from said sensor.

3. An optical system for an optical information recording/reproduction apparatus, comprising:

a light source;

an objective lens for focusing a light beam from said light source on a recording medium;

a galvano mirror for reflecting light from said light source to said objective lens, said galvano mirror arranged between said light source and said objective lens;

light beam splitting means arranged between said galvano mirror and said objective lens and for splitting a light beam being directed from said light source to said recording medium;

an aperture through which a light beam split by said light beam splitting means and not being directed to said recording medium passes; and a sensor for receiving the light beam having passed through said aperture, wherein a rotational angle of said galvano mirror is detected on the basis of an output from said sensor.

4. An optical system according to claim 3, wherein a light amount of said light source is detected on the basis of the output from said sensor.

5. An optical system according to claim 3, wherein said sensor comprises a two-divided detector.

6. An optical system for an optical information recording/reproduction apparatus, comprising:

a light source;

an objective lens for focusing a light beam from said light source on a recording medium;

a galvano mirror for reflecting light from said light source to said objective lens, said galvano mirror arranged between said light source and said objective lens;

light beam splitting means arranged between said galvano mirror and said objective lens and for splitting a light beam being directed from said light source to said recording medium;

a reflection member for reflecting a light beam split by said light beam splitting means and not being directed to said recording medium; and a sensor for receiving the light beam reflected by said reflection member and said galvano mirror, wherein a rotational angle of said galvano mirror is detected on the basis of an output from said sensor.

7. A method of detecting a rotational angle of a galvano mirror used in an optical information recording/reproduction apparatus, said method comprising the steps of:

arranging the galvano mirror, having a transmission aperture, between a light source and an objective lens for focusing a light beam from the light source onto a recording medium; and detecting the rotational angle of the galvano mirror by receiving the light beam from the light source through the transmission aperture.

8. A method according to claim 7, further comprising the step of detecting the amount of light emitted by the light source on the basis of the output of a sensor.

9. A method of detecting a rotational angle of a galvano mirror used in an optical information recording/reproduction apparatus, said method comprising the steps of:

arranging the galvano mirror between a light source and an objective lens for focusing a light beam from the light source onto a recording medium;

arranging light beam splitting means for splitting a light beam being directed from the light source to the recording medium, between the galvano mirror and the objective lens;

causing a light beam split by the light beam splitting means and not being directed to the recording medium to pass through an aperture; and detecting the rotational angle of the galvano mirror by receiving the light beam having passed through the aperture.

10. A method according to claim 9, further comprising the step of detecting the amount of light emitted by the light source on the basis of the output from a sensor.

11. An optical system according to claim 10, further comprising the step of providing the sensor comprising a two-divided detector.

12. A method of detecting a rotational angle of a galvano mirror used in an optical information recording/reproduction apparatus, said method comprising the steps of:

arranging the galvano mirror between a light source and an objective lens for focusing a light beam from the light source onto a recording medium;

arranging light beam splitting means for splitting a light beam being directed from the light source to the recording medium, between the galvano mirror and the objective lens;

reflecting a light beam split by the light beam splitting means and not being directed to the recording medium, by a reflection member; and detecting the rotational angle of the galvano mirror by receiving the light beam reflected by the reflection member and the galvano mirror.

* * * * *